United States Patent [19]

Andersson et al.

[11] 4,303,164

[45] Dec. 1, 1981

[54] STRUCTURE FOR DAMPING THE OSCILLATION OF BUILDING CRANES

[75] Inventors: Rickard Andersson, Vesteras; Ove Danerlov, Söderhamn, both of Sweden

[73] Assignee: Linden-Alimak AB, Vesteras, Sweden

[21] Appl. No.: 935,871

[22] Filed: Aug. 22, 1978

Related U.S. Application Data

[63] Continuation-in-part of Ser. No. 853,963, Nov. 22, 1977, abandoned, which is a continuation of Ser. No. 608,924, Aug. 29, 1975, abandoned.

[51] Int. Cl.³ .............................................. B66C 13/06
[52] U.S. Cl. .................................... 212/146; 212/196;
212/225; 188/378; 33/344
[58] Field of Search ......................... 33/344, 346, 396;
52/167; 74/581–591, 595, 603, 604; 188/1 B;
414/719; 274/23 R; 280/758; 212/146–147,
178, 195–197, 225

[56] References Cited

U.S. PATENT DOCUMENTS

| 3,240,353 | 3/1966 | Leavesley | 212/48 |
| 3,259,212 | 6/1966 | Nishioka et al. | 188/1 B |
| 3,533,524 | 10/1970 | Wilcox | 212/49 |
| 3,536,165 | 10/1970 | Desjardins | 188/1 B |
| 3,642,148 | 2/1972 | Durand | 212/48 |
| 3,851,767 | 12/1974 | Durand | 212/48 |

FOREIGN PATENT DOCUMENTS

| 316167 | 1/1920 | Fed. Rep. of Germany | 33/344 |
| 942348 | 5/1965 | Fed. Rep. of Germany | 212/48 |
| 1288993 | 2/1969 | Fed. Rep. of Germany | 414/719 |
| 246802 | 11/1969 | U.S.S.R. | 212/48 |

Primary Examiner—Trygve M. Blix
Assistant Examiner—R. B. Johnson
Attorney, Agent, or Firm—Fred Philpitt

[57] ABSTRACT

An apparatus for inhibiting the oscillation of a vertical crane or similar structure with a horizontal main jib supporting a load hoist apparatus. The main jib has a counter jib which supports a counterweight mass by a linkage system. The linkage system permits the counterweight mass to swing through an arc so that it dampening the swinging movement of the crane. The linkage system also permits the counterweight mass to be vertically adjustable relative to the main jib so as to accommodate crane structure of different sizes.

3 Claims, 5 Drawing Figures

STRUCTURE FOR DAMPING THE OSCILLATION OF BUILDING CRANES

CROSS REFERENCE TO RELATED CASES

This application is a continuation-in-part of Ser. No. 853,963 filed Nov. 22, 1977, now abandoned, which in turn is a continuation of Ser. No. 608,924 filed Aug. 29, 1975, now abandoned.

BACKGROUND

The technique of constructing high buildings has been developed remarkably in recent years. This development has been possible because of the use of building cranes that are able to operate at ever-increasing heights and hoisting capacities. Such development has very substantially reduced the manual labor required. Another desirable characteristic of modern building cranes is that they can be rapidly erected on a building site, and after the construction is completed, can be rapidly dismantled and transported to another building site.

A building crane for the construction of high buildings generally comprises a vertical derrick with a horizontally swinging jib at its upper end. The derrick consists of separate modular units that are joined together vertically to any desired height. Because of transportation limitations, the modular units must be limited as to their size and weight. In order to meet the limitations on reasonable transport weights and still achieve an increased hoisting capacity, crane manufacturers have tried to use high-strength and light-weight materials in the manufacture of cranes. One disadvantage has been that from a fatigue point of view such materials are generally not better then the material heretofore used. In some cases it has been possible to compensate for part of the fatigue by a more favorable design of the structural parts subjected to fatigue. However, one type of fatigue load which cannot be influenced by such measures and for which no solution was found so far, are stresses resulting from the oscillations of a crane.

A modern building crane can be constructed with an unstayed derrick to a substantial height. A relatively large part of the total mass of such a hoisting crane consists of the horizontally swinging jib supported at the upper end of the derrick. This swinging jib usually includes (a) a main jib having a carriage fitted with a load lifting device that is movable along the main jib and supported thereby and (b) a counter jib containing counterweights and hoisting machinery. The carriage which runs along the main jib usually is provided with a hook for raising or lowering a useful load. For such a crane, manufactured of high-quality steel, the rigidness of the whole structure is low. Loading and unloading operations give rise to oscillations imparting a translatory movement to the derrick by deflections and a rotary movement to the jib owing to angular variations at the top of the derrick.

It is generally known in mechanical engineering that oscillations can be damped out by coupling via a damping means to a weight mass. Known damping means may consist e.g. of a hydraulic or mechanical friction means.

This general knowledge has not been applied to the damping of crane derrick oscillations because as the derrick is extended as the building increases in height, the size of such a couterweight would also have to be changed.

THE PRESENT INVENTION

In accordance with the present invention a pendulating counterweight mass is provided and the pendulating counterweight mass is coupled via an adjustable damping means to the counterjib. The invention involves supporting the counterweight mass on a pendulum-type support, the pendulum length being adjustable.

IN THE DRAWINGS

Figure 1:
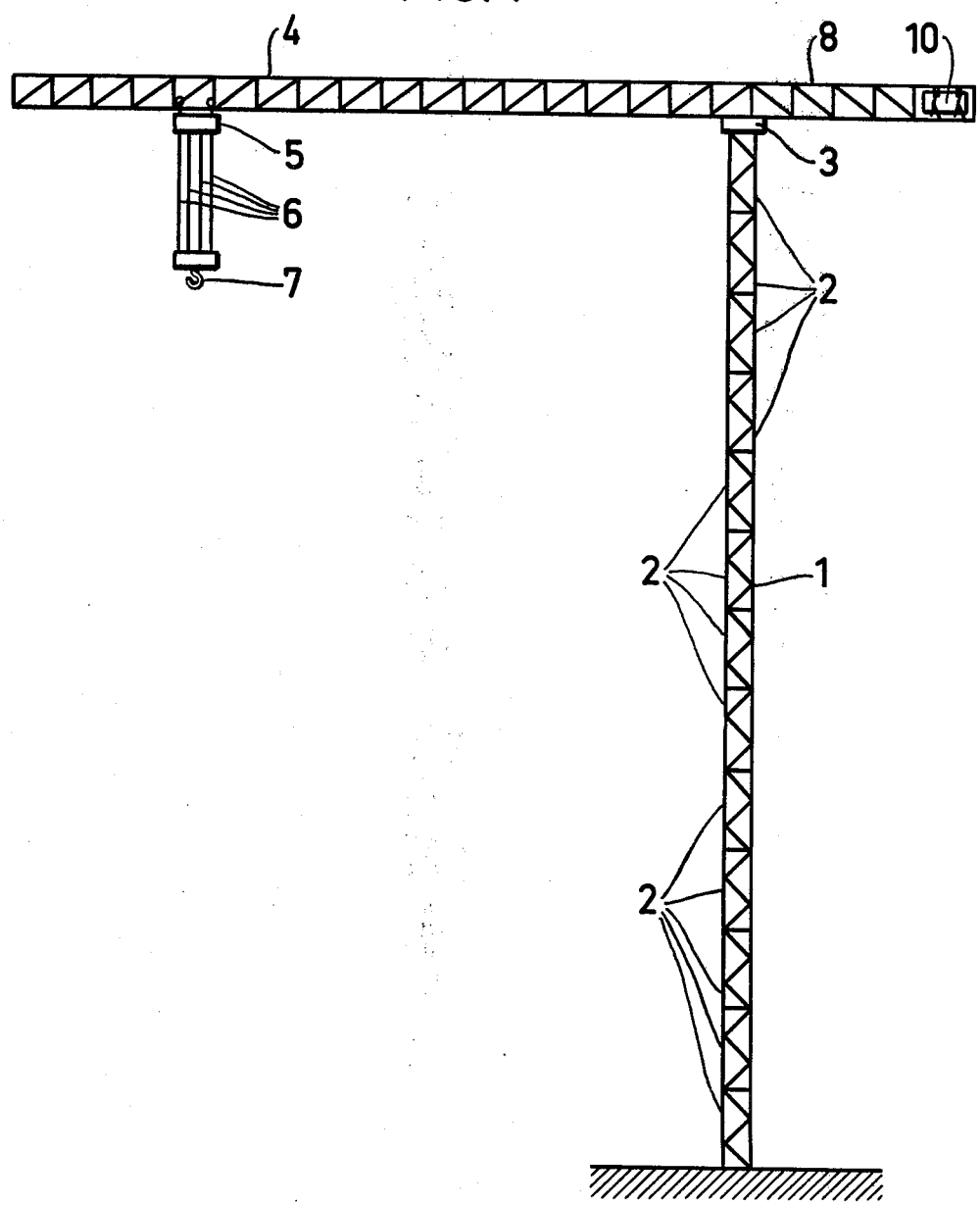
FIG. 1 is a side elevation view of a building crane according to the invention having a main jib, a counter jib, a derrick and a counterweight mass.

As appears from FIG. 1, a crane derrick 1 is assembled from a plurality of modular units 2. At the upper end of the derrick a slew base 3 is provided which supports one end of a main jib 4. From the radially movable carriage 5 a hook block 7 is suspended with wires 6. A counter jib 8 contains hoisting machinery, control equipment and a counterweight 10 supported on a pendulating platform 17. The platform 17 is designed to swing back and forth in a direction corresponding to the longitudinal axis of the counter jib 8.

Figure 2:
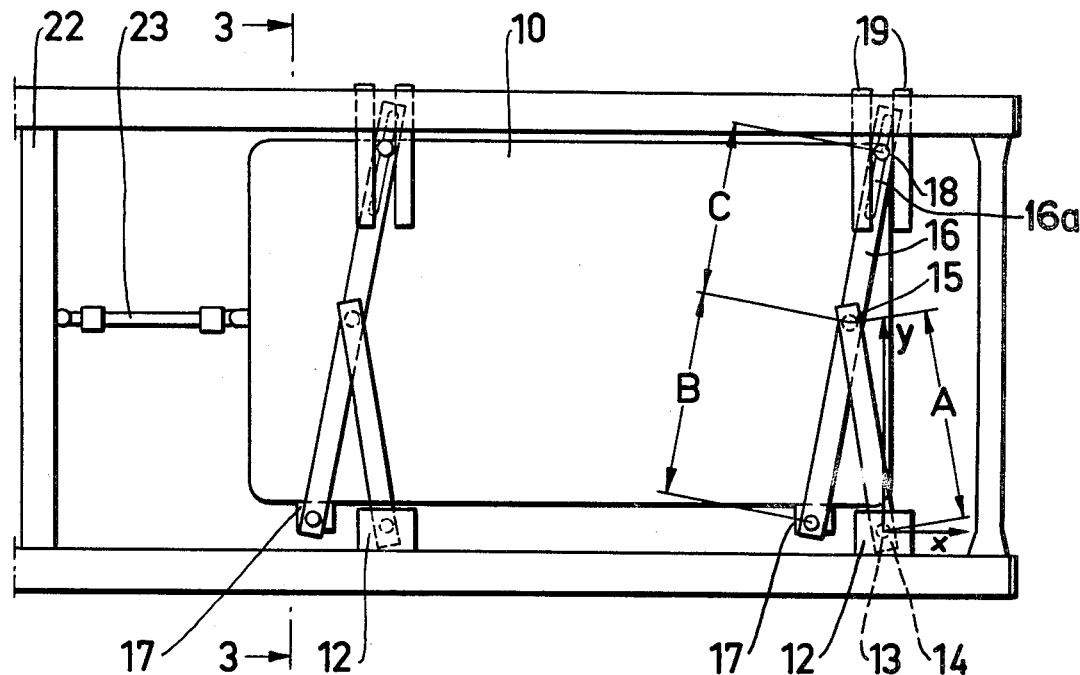
FIG. 2 is on a larger scale a side elevation view of an arrangement for suspending the counterweight on the counter jib according to FIG. 1.
Figure 3:
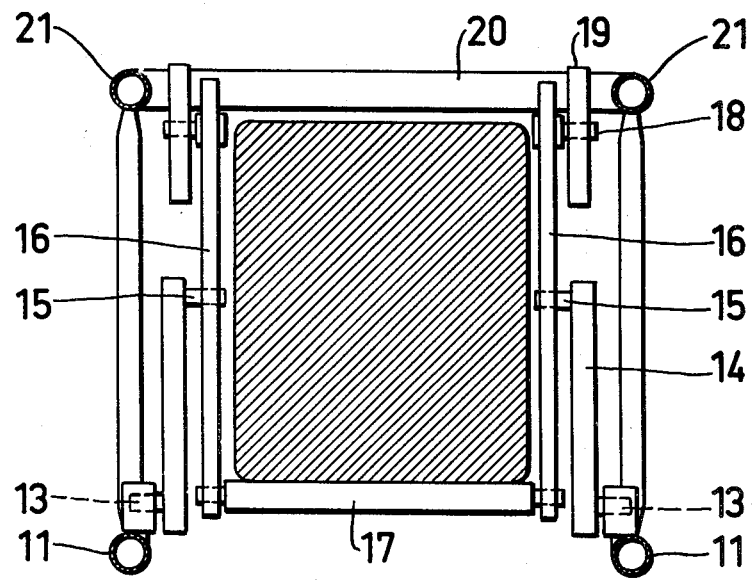
FIG. 3 is a cross-section along 3—3 in FIG. 2.

FIGS. 2 and 3 show in greater detail how the counterweight 10 is supported by the counter jib 8. The counterweight rests on a platform or cradle consisting of two yokes 17. The yokes are interconnected to the counter jib 8 by a linkage arrangement described hereinafter.

On the lower side or corner tubes of the counter jib 8, bearing housings 12 are mounted, with axles 13 attached to links 14 supported therein. The links 14 are joined to upper links 16 by axles 15 and the lower ends of links 16 are provided with bearing holes for supporting the ends of the yokes 17. The links 16 are provided at their upper ends with axles 18 which are adjustable along the length of link 16 (for example the axle 18 can be fitted into a slot 16a in link 16 and locked in the desired position along the slot by a clamp, bolt, screw or the like. The axle 18 may also be attached to a sleeve extending along the outside of the link 16, to which it can be locked by a cotter pin. Once the axle is locked in the desired place along the link 16, it is designed to slide up and down spaced apart guide bars 19, and guide bars 19 are rigidly connected to a rod 20 of the counter jib 8, which in turn is rigidly connected to upper corner tubes 21 of the counter jib 8.

Between the counterweight 10, which is swingingly supported by the aforesaid yokes and links, and the rod 22, which is rigidly attached to the frame of the counter jib 8, a damping means 23 is provided. The damping means 23 could just as well be interconnected between said rod 22 of the counter jib and a yoke 17 or cradle that supports the counterweight 10. The damping means 23 is designed to absorb at least part of the oscillation energy of the counterweight 10 and to convert it into heat. The damping means can be of any known design and may be, for example, of the hydraulic, pneumatic, electric or mechanical type. The degree of damping can be controlled in any known manner (e.g. in hydraulic and pneumatic types by adjustable throttlings, in the electric type by adjustable resistances, or in the mechanical type by adjustable pressure force on friction surfaces). In all cases heat develops which is dissipated. The adjustment of the damping means 23 takes place as a presetting, in which the braking force is selected depending upon the size of the counterweight mass and the extent of the pendulum deflection. Maximum damping is usually desired.

FIG. 2 shows the counterweight 10 swung out to the left of its position of equilibrium. In this Figure, on the links 14 and 16, the distances A, B and C are set off between the bearing points 13-15, 17-15 and 15-18. The distances A and B have a constant length while the distance C can be adjusted in that the axle 18 can be moved along the length of link 16 and can be locked in different places along link 16 as described above.

It is to be observed that the system described above includes two linkages operating in parallel. This means that during oscillation the counterweight 10 moves thru an arc, the radius of which is equal to the pendulum length, so that the center of gravity of the weight moves thru said arc, irrespective of the configuration of the weight.

The system can also comprise only one linkage, but in such case the weight 10 must have its center of gravity in the center of rotation of the axle 17 at its attachment to the link 16.

The above described arrangement has only two adjustments that have to be made once the counterweight has been set in place on the counter jib. These two adjustments are the setting on the damping means and the position of the axle 18. An empirical way to make these adjustments is to assemble the crane unit as shown in FIG. 1, connect the hook 7 to a test weight, run the carriage to the end of the main jib 4 and then operate the crane in such a way as to cause the load to swing. Measure the time of a complete oscillation of the load (e.g. from bottom position to top position and back to bottom position). Next move the position of the axle 18 along link 16 to see if it shortens the oscillation, and if it does move the axle further along link 16. Continue doing this until the maximum inhibition of oscillation occurs. Do the same thing with the damping means 23 by adjusting the degree of damping of the damping means until the optimum inhibition of oscillation is achieved.

An alternate method would be to determine the natural frequency of the crane by locking the counterweight and causing the jib structure to swing up and down vertically. In cranes this is most easily effected by hoisting a load. The time for an amplitude of the load to swing from a topmost position to a lowermost position can then be measured, whereafter the swinging time of the counterweight is adjusted to approximately the same value by adjusting the distance C. The link 16 can be marked with different positions for the axle 18 for different swinging times.

It is apparent from the geometry in FIG. 2 that upon oscillation the axle 18 moves in vertical direction, but is fixed in horizontal direction. Consequently, the axle must run in guides 19.

Figure 4:
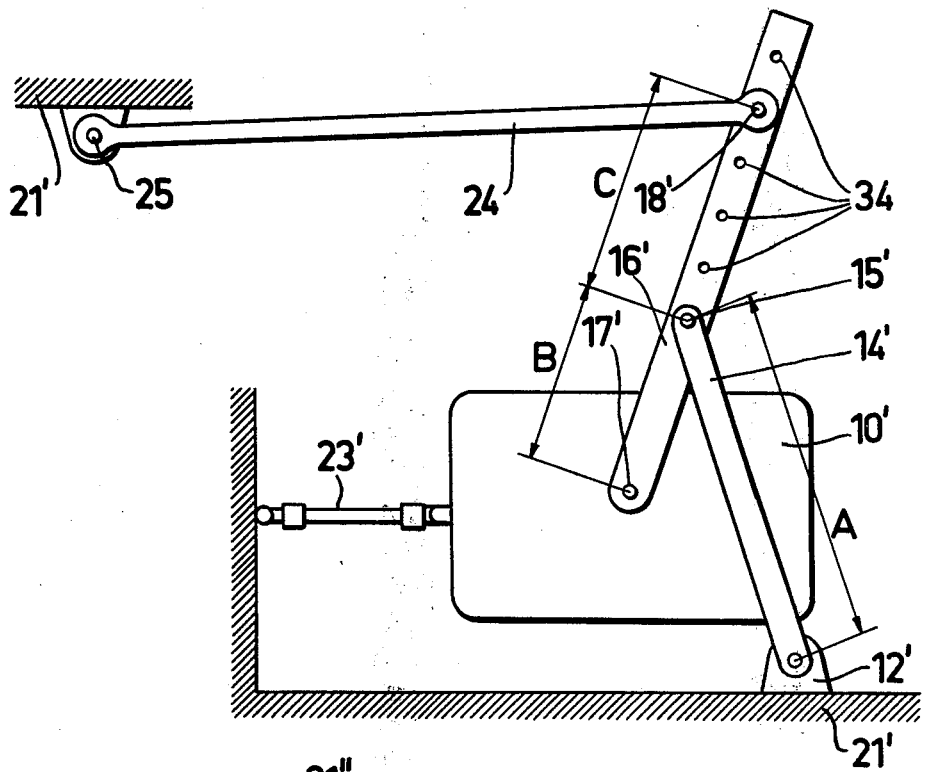
FIGS. 4 and 5 are side elevation views of alternative arrangements for suspending a counterweight according to the invention for damping oscillations.

FIG. 4 shows another embodiment of the invention, in which the guides 19 are replaced by a link 24, which through an axle 25 is rotatably connected to corner tubes 21' of the counter jib. The other end of the link 24 is connected to the axle 18', which is movable along the link 16'. The axle 18' in this embodiment will move through a vertical arc having the link 24 as radius. When the link 24 is relatively long (about 3-4 m) the lateral movement will be insignificantly small and does not disturb the functioning of the oscillation damping system, which is similar to that of FIGS. 1-3.

Figure 5:
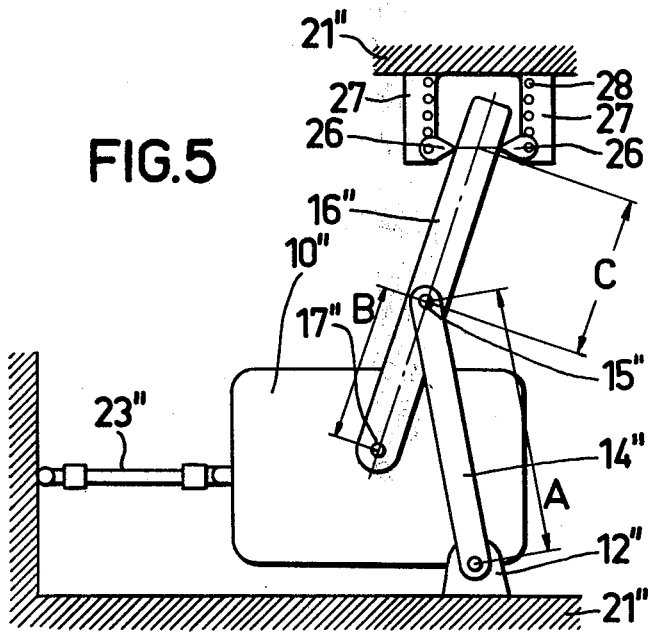

FIG. 5 shows still another embodiment of the invention where the guides 19 have been replaced by supports 26, which are attached to brackets 27, which in turn are attached to the corner tubes 21" of the counter jib. Brackets 27 are provided with a number of holes 28 so that the supports 26 can be moved upward or downward. The link 16" is fixed horizontally by the supports 26 but can slide in its longitudinal direction. The distance C here will vary slightly at oscillation, but this variation at small oscillation movements is negligible from a function point of view. The adjusting of the distance C for different frequencies is effected by moving the supports 26.

The invention can be applied to the damping of oscillations of structures other than crane structures. The structure may be provided with a non-swinging counterweight in addition to the swinging counterweight. The invention can also be applied to the damping of oscillations due to a dynamic wind load. If the linkage is turned in the horizontal plane through 90 degrees, the invention could be utilized for torsional oscillations.

In conclusion, while there has been illustrated and described some preferred embodiments of our invention, it is to be understood that since the various details of construction may obviously be varied considerably without really departing from the basic principles and teachings of this invention, we do not limit ourselves to the precise constructions herein disclosed and the right is specifically reserved to encompass all changes and modifications coming within the scope of the invention as defined in the appended claims.

Having thus described our invention, what we claim as new and desire to secure a United States Letters Patent on is:

1. In a tower crane lifting device which includes
   a substantially vertical tower supporting a horizontally extending jib intermediate its ends, said jib being composed of a main jib and a counter jib,
   a carriage fitted with a load lifting device that is movable along said main jib and supported thereby,
   a counterweight mass,
   support means on said counter jib for supporting said counterweight mass on said counter jib so that the counterweight can move essentially longitudinally back and forth along a limited path that is approximately parallel to the longitudinal axis of the counter jib,
   damping means interconnecting the supported counterweight mass with said counter jib, said damping means serving to resist the tendency of said counterweight mass to swing,
   the improvement being that said support means includes
   (1) a first linkage which has its lower end pivotally attached by means of a first axle to said counter jib, and
   (2) a second linkage having its lower end mounted in supporting relationship to the counterweight mass so that the counterweight mass can move through a limited arc that is approximately parallel to the longitudinal axis of the jib,
   (3) a generally vertical guideway mounted on said counter jib, the upper end of said second linkage being mounted for vertical movement within said guideway.

(4) pivot means adjacent the upper end of said second linkage so that said upper end can pivot while moving along said generally vertical guideway, (5) a second axle located intermediate the ends of said second linkage, said second axle pivotally interconnecting the upper end of said first linkage to said second linkage.

2. A device according to claim 1 wherein the upper end of said second linkage is provided with a third axle adjacent its upper end which serves as a pivot point for the upper end, the distance between said second axle and said third axle being adjustable and said third axle being vertically movable.

3. A device according to claim 1 wherein the upper end of said second linkage is guided in a generally vertical path by means of a third linkage which has one end pivotally attached to the upper end of said second linkage and its other end pivotally attached to said counter jib.

* * * * *

UNITED STATES PATENT AND TRADEMARK OFFICE
CERTIFICATE OF CORRECTION

PATENT NO. : 4,303,164
DATED : December 1, 1981
INVENTOR(S) : RICKARD ANDERSSON et al It is certified that error appears in the above—identified patent and that said Letters Patent is hereby corrected as shown below:

On the cover page please insert Item

-- [30] Foreign Application Priority Data
September 2, 1974 [SE] Sweden 7411079 --

Signed and Sealed this

Twenty-seventh Day of April 1982

|SEAL|

Attest:

GERALD J. MOSSINGHOFF

*Attesting Officer*     *Commissioner of Patents and Trademarks*